though the melting point of hydrazine is +1.4° C. it is necessary to maintain the hydrazine above this

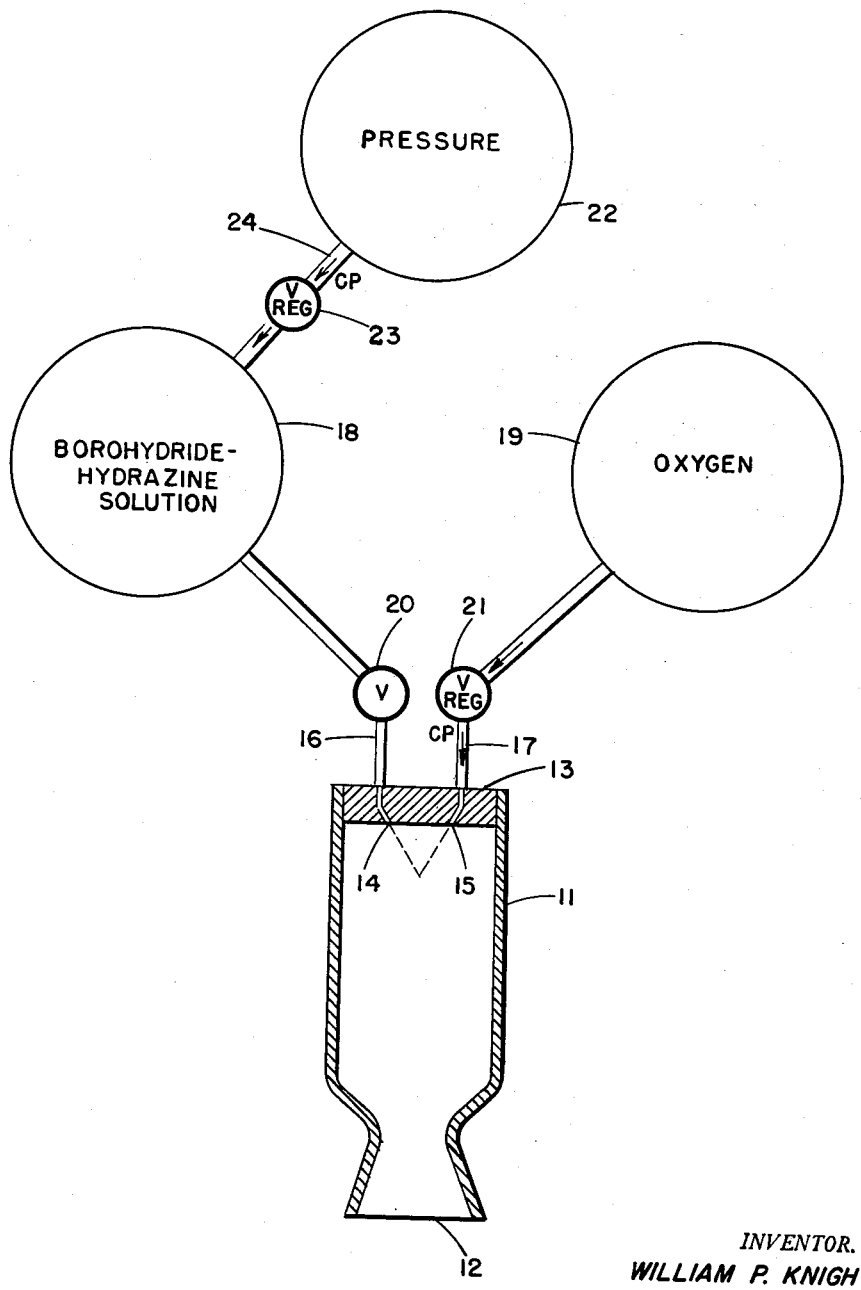

United States Patent Office
3,132,977
Patented May 12, 1964

3,132,977
HYDRAZINE BASE FUEL
William P. Knight, Covina, Calif., assignor, by mesne assignments, to Aerojet-General Corporation, Cincinnati, Ohio, a corporation of Ohio
Filed Oct. 4, 1948, Ser. No. 52,680
9 Claims. (Cl. 149—36)

This invention relates to jet propulsion, and to fuel for the operation of liquid type rocket motors.

An object of this invention is to provide an improved liquid fuel whose principal component is hydrazine and which may be stored and maintained in its liquid state at temperatures far below the melting point of pure hydrazine.

A related object is to operate a jet motor by a hydrazine-base fuel.

Rocket motors have heretofore been operated by injecting into the combustion chamber of the motor a liquid fuel or propellant and combusting or decomposing it in the chamber to produce gases which are ejected from the chamber under pressure through an exhaust nozzle to create the thrust.

Hydrazine possesses many properties that make it a desirable fuel for powering liquid propellant rocket motors. Hydrazine develops a high specific impulse; and since it contains only hydrogen and nitrogen it gives off on decomposition, a substantially smokeless and non-toxic exhaust. Furthermore, it is not explosive, has a boiling point above that of water which makes it easy to ship and store, and has a specific gravity approximately the same as water. In spite of these advantages, however, the use of hydrazine has been limited due to the fact that the pure material has the relatively high melting point of about +1.4° C. Therefore, it cannot be safely used where either the containers or the conduit lines leading to the motors may become exposed to temperatures substantially below 0° C. for any length of time. Since many operations to which rocket motors are adapted are conducted in regions where the temperatures are far below 0° C. it has not been feasible to employ hydrazine in its pure state.

In previous attempts to make hydrazine practical as a rocket motor fuel, substances have previously been added which effectively lower its melting point. Some of the materials which have been tried are water, alcohol, ether and acetone. The addition of beneficial proportions of any one of these substances, however, generally produces a fuel mixture having a lower specific impulse than pure hydrazine, due to the fact that the melting point depressant generally absorbs some of the energy available on the decomposition of the hydrazine to convert it to the gaseous state. This in effect nullifies the advantage of using such hydrazine mixtures as fuels for rocket motors since the ultimate available energy from the mixtures for creating thrust is little more than that developed by commoner and cheaper liquid propellant fuels.

The term "specific impulse" as used in this specification means pounds of thrust produced when one pound of propellant is burned in one second. The unit in which the specific impulse is expressed is seconds.

According to my invention I have developed an improved hydrazine-base fuel that can be used at reduced temperatures in its liquid state and produces a specific impulse even higher than that of pure hydrazine. I have accomplished this by my discovery that the melting point of hydrazine may be effectively lowered by the addition of a class of chemical compounds which do not reduce the specific impulse, but actually increases the ultimate specific impulse above that of pure hydrazine.

The compounds which I have discovered will do this are the alkali metal borohydrides. I have found that lithium borohydride, sodium borohydride and potassium borohydride can each be used for the purpose.

The invention will be better understood from the following detailed description and accompanying drawing which shows schematically the conventional type of jet motor in cross section with the propellant containers attached to the motor.

The motor comprises a combustion chamber 11 having an exhaust nozzle 12 at one end and an injector cap 13 at the opposite end.

The injector cap is provided with jet openings 14 and 15 which are connected to a pair of conduits 16 and 17 leading to tanks 18 and 19 respectively.

The tank 18 containing the hydrazine-borohydride solution is connected by conduit 16 to the injector cap 13 while tank 19 containing oxygen either in liquid form or as a compressed gas is connected by conduit 17 to the proper nozzle in the reaction chamber. A shutoff valve 20 is placed in conduit 16 and a constant pressure release valve 21 is placed in conduit 17 between the oxygen tank and the reaction chamber. A pressure tank 22 containing nitrogen, or other inert gas under pressure, such as helium or argon is used to displace the hydrazine-borohydride fuel from container 18. A constant pressure valve 23 is placed in the line 24 between tank 22 and the fuel tank 18 thereby subjecting the hydrazine-borohydride mixture to a constant pressure at all times, which pressure is sufficiently elevated to overcome the chamber pressure when the motor is in operation.

The addition of an alkali metal borohydride to hydrazine not only serves to depress the melting point of pure hydrazine, but also develops increased specific impulse, since this class of compounds are high energy substances which have high heats of combustion and yield low molecular weight combustion products. The solution of the hydrazine and the alkali metal borohydride, therefore, provides a fuel which is more satisfactory for use in rocket motor operation than pure hydrazine itself.

Even a very small proportion of the borohydride in the hydrazine will manifest itself to some extent. I have found that the advantage of my invention is realized when the amount of alkali metal borohydride which is used lies from a mere trace to the percentage at which a saturated solution of hydrazine and the particular alkali metal borohydride is obtained. The saturation point of the alkali metal borohydrides in the hydrazine varies from about 15% by weight for lithium borohydride the lowest member of the series and increases to 20% for the sodium borohydride.

The preferred alkali metal borohydride is lithium borohydride because of its low molecular weight and high heat of combustion. This compound is particularly effective in lowering the melting point to the lowest point of any of the alkali metal borohydrides. For example, the melting point of hydrazine is lowered to approximately −23° C. by the addition of only 5.25% by weight of lithium borohydride based on the weight of the hydrazine in the mixture, while 6.1% by weight of lithium borohydride based on the weight of the hydrazine depresses the melting point to −27° C. Smaller amounts of the borohydride would produce correspondingly less lowering of the melting point; 12.25% by weight of lithium borohydride based on the weight of the solution will lower the melting point to −44° C. The maximum possible lowering of the melting point is to −47° C.; and this is obtained when 13.25% by weight of lithium borohydride based on the weight of the solution, is dissolved in the hydrazine. The saturation point, which occurs when approximately 15% by weight of lithium borohydride, based on the weight of the hydrazine, is dissolved in the hydrazine, appears to produce a solution which has a somewhat higher melting point than −47° C., it having been determined that a saturated solution of hydrazine and lithium borohydride melts at −38° C. It can accordingly be stated that the addition of increasing percentages of lithium borohydride from a trace up to the 13.25%, by weight, lowers the melting point; and beyond that concentration the melting point rises slightly. It may be desired in some instances, where an extremely low melting point is not essential, to employ greater concentrations of lithium borohydride than the 13.25% by weight, for the purpose of thereby increasing the available energy that can be obtained from the combustion of the solution.

Another example of the lowering of the melting point by an alkali metal borohydride dissolved in hydrazine is a solution of hydrazine and sodium borohydride. It has been observed that the amount of the alkali metal borohydride required to produce a saturated solution appears to increase with the molecular weight of the particular alkali metal borohydride which is added. Thus, for example, lithium borohydride having the lowest molecular weight also has the lowest saturation percent about 15% by weight based on the weight of the hydrazine, while sodium borohydride having a higher molecular weight has a saturation percentage approximately 20% by weight based on the weight of the hydrazine.

That the addition of an alkali metal borohydride to the hydrazine produces a fuel mixture that develops greater specific impulse upon combustion of the mixture than is obtainable from burning pure hydrazine, is clearly demonstrated by the fact that while the specfic impulse obtainable from the decomposition of pure hydrazine when burned with liquid oxygen is approximately 270 sec. the addition of about 15% by weight of lithium borohydride to the hydrazine will produce a solution that develops a specific impulse of approximately 300 sec. when the solution is burned with liquid oxygen showing an increase of 20 to 30 seconds above the specific impulse of pure hydrazine. This is of particular advantage in cases where the energy derived from the propellant solution must be maintained at its highest level and the solution will not be subjected to very low temperatures.

It will be recognized that an advantage of my novel fuel is that it makes available the very desirable compound, hydrazine, for use as a fuel in liquid jet motors, which operation up to the present time has been regarded as impractical due to its relatively elevated melting point.

A further advantage is that by employing the solution according to my invention, I have made available a fuel of higher impulse than has been heretofore possible by using pure hydrazine alone and this fuel combination still retains all of the desirable features of pure hydrazine.

I claim:
1. A fuel composition for jet propulsion motors comprising a solution of sodium borohydride in hydrazine.
2. A fuel composition for jet propulsion motors comprising a solution of potassium borohydride in hydrazine.
3. The method of lowering the melting point of pure hydrazine and raising the specific impulse which comprises dissolving in the hydrazine a compound selected from the group consisting of lithium borohydride, sodium borohydride and potassium borohydride.
4. The method of lowering the melting point of pure hydrazine and raising the specific impulse which comprises dissolving in the hydrazine 13.25% by weight based on the weight of the total solution of lithium borohydride.
5. A method of lowering the melting point of pure hydrazine and raising the specific impulse which comprises dissolivng in the hydrazine a compound selected from the group consisting of lithium borohydride, sodium borohydride and potassium borohydride, said compound being present in a quantity sufficient to form a saturated solution with the hydrazine.
6. A method of lowering the melting point of hydrazine and raising the specific impulse which comprises dissolving sufficient lithium borohydride in the hydrazine to form a saturated solution.
7. A low melting point hydrazine base fuel consisting of hydrazine having dissolved in it up to 15.6% by weight of lithium borohydride based on the weight of the total solution.
8. A low melting point hydrazine base fuel consisting of a solution of about 13% by weight lithium borohydride dissolved in hydrazine.
9. A low melting point hydrazine base fuel consisting of hydrazine having dissolved in it up to 20% by weight sodium borohydride based on the weight of the total solution.

References Cited in the file of this patent

UNITED STATES PATENTS

| | | |
|---|---|---|
| 1,827,675 | Snelling et al. | Oct. 13, 1931 |
| 2,455,205 | Whetstone et al. | Nov. 30, 1948 |
| 2,461,661 | Schlesinger | Feb. 15, 1949 |
| 2,461,777 | Zwicky | Feb. 15, 1949 |
| 2,461,797 | Zwicky | Feb. 15, 1949 |
| 2,470,082 | Tyre | May 10, 1949 |
| 2,474,183 | King | June 21, 1949 |
| 2,489,051 | Sayward et al. | Nov. 22, 1949 |

OTHER REFERENCES

Jour. Amer. Rocket Soc., No. 72, December 1947, pages 10 and 14.

Jour. of Amer. Chem. Soc., vol. 69, page 1200, May 1947.

"General Chemistry," by Deming, pages 262 and 371, Published in 1923.

McLarren: "Automotive and Aviation Industries," August 15, 1946, 52/J & R, pages 20 to 23 and 76.